United States Patent [19]

Keryvel et al.

[11] Patent Number: 5,274,580
[45] Date of Patent: Dec. 28, 1993

[54] METHOD FOR CALCULATING THE INVERSE OF A NUMBER, AND COMPUTER FOR PERFORMING THE METHOD

[75] Inventors: Georges Keryvel, Versailles; Jean-Louis Thomas, Clamart, both of France

[73] Assignee: Bull, S.A., Paris, France

[21] Appl. No.: 939,435

[22] Filed: Sep. 4, 1992

Related U.S. Application Data

[63] Continuation of Ser. No. 672,085, Mar. 19, 1991, abandoned.

[30] Foreign Application Priority Data

Mar. 21, 1990 [FR] France ............... 90 03605

[51] Int. Cl.$^5$ ............................................. G06F 7/52
[52] U.S. Cl. ............................................. 364/764
[58] Field of Search ................. 364/764, 765, 761

[56] References Cited

U.S. PATENT DOCUMENTS

| | | | |
|---|---|---|---|
| 4,374,427 | 2/1983 | Katayama | 364/761 |
| 4,482,975 | 11/1984 | King et al. | 364/608 |
| 4,797,849 | 1/1989 | Nakano | 364/765 |
| 4,823,301 | 4/1989 | Knierim | 364/761 |
| 4,991,132 | 2/1991 | Kadota | 364/765 |
| 5,012,438 | 4/1991 | Yamaguchi | 364/765 |

FOREIGN PATENT DOCUMENTS

0149248 9/1985 European Pat. Off. .

OTHER PUBLICATIONS

IBM Technical Disclosure Bulletin, vol. 26, No. 3B, Aug. 1983, pp. 1537–1539, NY, C. Galano, "Fast Division".

*Primary Examiner*—Tan V. Mai
*Attorney, Agent, or Firm*—Kerkam, Stowell, Kondracki & Clarke

[57] ABSTRACT

A computer and method that can be used in digital computers to calculate the inverse I of a number D. The inverse is approximated by I2 after the application of a complementary correction Cjl to an approximation I1 obtained by linear approximation on the basis of a first value Io which in turn is obtained on the basis of an inverse table. The correction value Cjl is obtained from pre-established data CBl and Hj that are memorized in tables of reduced dimensions.

23 Claims, 4 Drawing Sheets

FIG_1

FIG_2

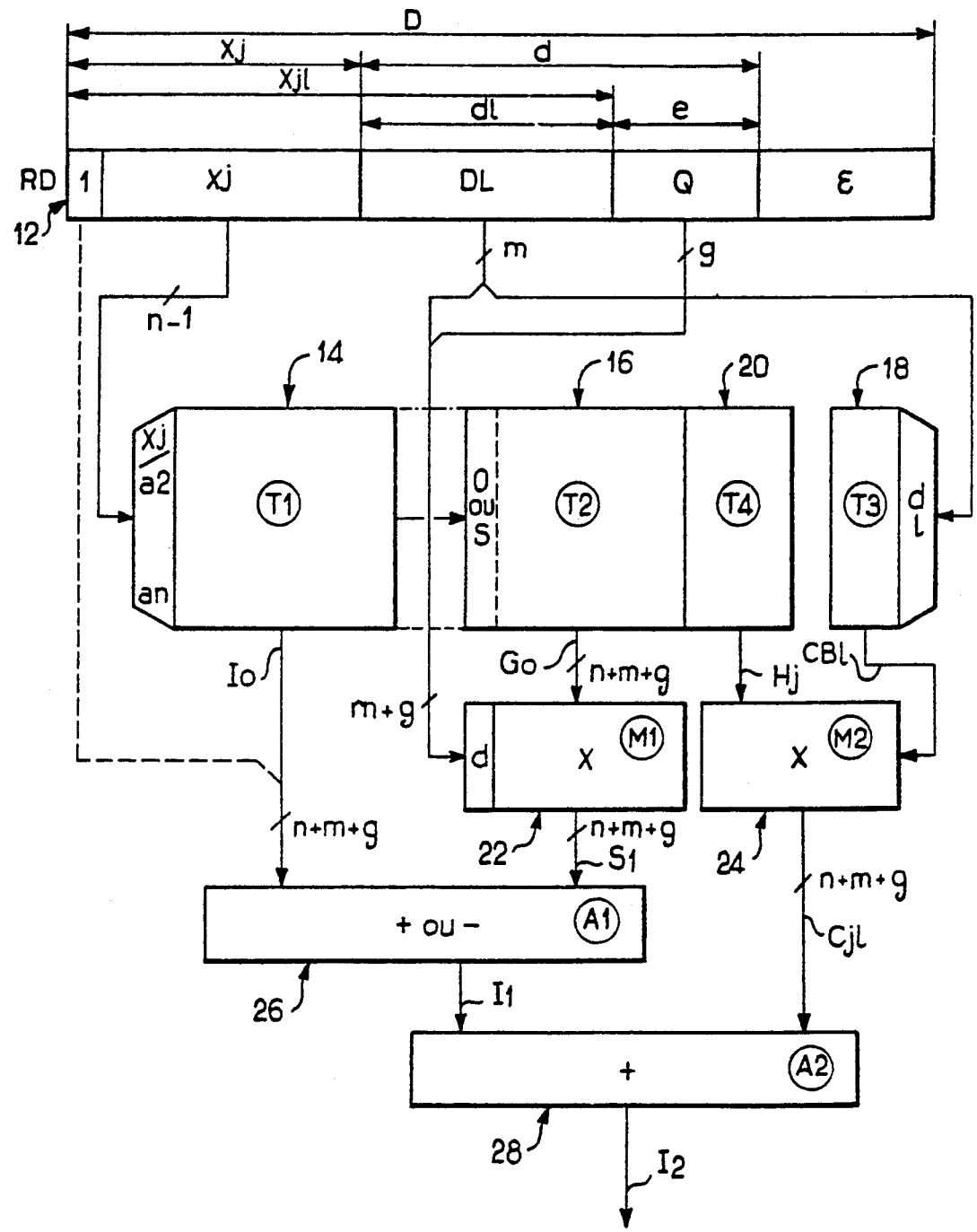
FIG_4

METHOD FOR CALCULATING THE INVERSE OF A NUMBER, AND COMPUTER FOR PERFORMING THE METHOD

This is a continuation of application Ser. No. 672,085, filed Mar. 19, 1991, now abandoned.

FIELD OF THE INVENTION

The present invention relates to a method that can be used in digital computers to calculate the inverse of a number.

BACKGROUND OF THE INVENTION

Calculating the inverse of a number has an important application in the division operation, particularly with a floating decimal. In particular, the result of the division of two numbers is obtained by simple multiplication of the dividend with the inverse of the divisor.

Typically, the division or calculation of the inverse I of a number D is attained by methods that can be classified into two main groups:

methods that work with subtraction and successive shifts, and iterative methods, which are generally based on Newton's algorithm, by the recurrent equation:

$$In+1 = In \times (2-(D \times In)),$$

in which In converges toward I.

In practice, with the subtraction and shifting methods, no more than 1 or 2 significant additional bits can be obtained at each step. Hence these methods require large-volume operator circuits, which are generally slow and are hard to integrate.

For scientific computers, in which the performance of the division operation is of prime importance, the iterative methods are generally preferred. If Newton's method is applied to standardized numbers, the precision of the result per iteration can be doubled. Nevertheless, each operation requires two multiplications performed in sequence, which hence cannot be parallelized. Moreover, to reduce the number of iterations, inverse tables are generally used to obtain the initial value of the iteration. In that case, the precision of the initial value is limited by the physical size of the inverse table, necessitating $2^{n-1}$ entries if the increment i of the table is selected to be equal to $2^{-n}$, for a precision on the order of $2^{2n}$, hence 2n significant bits.

OBJECT AND SUMMARY OF THE INVENTION

The present invention proposes a new method for calculating an inverse, with which the disadvantages discussed above can be eliminated or their effects diminished, and which lends itself well to integration of the operators because it reduces the number and size of the circuits.

More particularly, the invention proposes a method for calculating the inverse I of a number D, characterized in that it includes the following operations:

a) conversion to binary form and standardization of the number D, as applicable, b) searching in an inverse table T1 for a first approximation Io of the inverse of the number D, on the basis of n first most significant bits of D corresponding to an input value $Xj-\frac{1}{2}+(j \times 2^{-n})$, where j is an integer from 0 to $2^{n-1}-1$, c) searching in a divergence table T2 for the inverse divergence gradient Go=Io/i in the interval ij=[(Xj), ((Xj)+i)[ framing the value D, with $i=2^{-n}$, d) by linear approximation, determining a second value I1 by using the algorithm $I1=Io+(d \times Go)$, where $d=D-Xj$ and Go is entered as an algebraic value, e) searching in a correction table T3, on the basis of d, for a pre-established basic correction value CBl, which may or may not be signed, representing the divergence E=I−I1 in the basic interval iB=[(XjB), ((XjB)+i)[, f) searching in a scale table T4 for a scale factor Hj on the basis of Xj, g) determining a correction value $Cjl = CBl \times Hj$, and h) determining a third approximation $I2 = I1 + Cjl$.

Thus the principle of the invention is based on the application of a complementary correction to an approximation I1 obtained by linear approximation on the basis of a first value Io, which is turn is obtained from an inverse table. The value of the correction is obtained from pre-established data memorized in reduced-size tables. It is thus possible, in a first period of time, without having recourse to Newton's iterative method, to obtain inverses of considerable precision (28 bits) from tables of easily integratable sizes.

In a first variant of the method of the invention, the method includes the operation of using Newton's iterative method, in which the kth iteration is given by the following algorithm:

$$INk = (IN(k-1)) \times (2-(D \times (IN(k-1)))),$$

where INo=I2.

In another feature of the invention, the entry of the correction table T3 is done on the basis of the m bits following the n most significant bits of D, and $CBl = I((Xjb)+(1 \times 2^{-m-n})) - I1((Xjb)+(1 \times 2^{-m-n}))$, for $1 \times 2^{-m-n} \leq d < (l+1) \times 2^{-m-n}$, where l is an integer between 0 and $2^m - 1$.

Advantageously, Hj in table T4 is given by the formula $Hj = (Xjb/Xj)^3$. This arrangement of the two tables T3 and T4 enables substantial improvement in the size of the operators, compared with an equivalent correction table that furnishes the value Cjl directly at its output.

The method of the invention is particularly well adapted to making scientific calculation units with floating variables in the processors of a digital computer, such as a vector computer.

The invention also relates to a digital computer for performing the method of one of the foregoing claims, characterized in that it includes in at least one of its processors:

means for conversion to binary form and standardization of the number D;

a inverse table T1 addressed as a function of the n most significant bits of the number D and having the output Io, a divergence gradient table T2 addressed as a function of the n most significant bits of the number D and having the output Io, a multiplier circuit M1 having the output S1 and the entry multiplier of which receives at least m bits following the n most significant bits of D and the entry multiplicand receives Go, a correction table T3, addressed as a function of the m bits following the n most significant bits of D and having the output CBl, a scale table T4 addressed as a function of the n most significant bits of the number D and having the output Hj, a second multiplier circuit M2, the inputs of which receive CBl and Hj and which has the output Cjl, and adding means (A1 and A2) with three inputs receiving Io, S1 and Cjl, and having the output I2.

Advantageously, a variant of the computer of the invention is characterized in that the table T2, the multiplier M1 and the adding means A1, A2 work on signed operands. It is thus possible to gain at least a further one bit of precision.

Further advantages and characteristics of the invention will become apparent from the ensuing description, taken in conjunction with the drawings.

BRIEF DESCRIPTION OF THE DRAWINGS

FIG. 4 is a schematic representation of an apparatus for performing the method of the invention, in a digital computer.

DESCRIPTION OF THE PREFERRED EMBODIMENTS

The invention is generally applicable to the calculation of the inverse of numbers, in a fixed or floating format, the precision of which is limited by the size of the format used by the computer. In the case of a floating format number, the invention is applicable directly to calculating the inverse of the mantissa of this number.

In the context of a scientific computer unit, which always includes a multiplier, it is understood that the calculation of the inverses according to the invention makes it possible to perform division without additional modifications.

It should be noted that all the inverse calculations relate to calculating the inverse of a fixed-format number or (in the case of a floating format) of a mantissa, conversion to binary form and standardized to base 2 (the most significant bit in that case equals 1), and the decimal value of which is consequently between 0.5 and 1. All the other manipulations are in fact multiplications or divisions by a power of 2, by way of shift operations. The operations for conversion to binary form, standardization and shifting are conventional and hence will not be described in further detail below. The same is true for the means and circuits for performing these operations in a digital computer. Thus the first operation to be performed in the context of the method of the invention is the conversion to binary form and standardization of the number in question, if this operation has not already been done beforehand.

In the ensuing description, given by way of example and understood not to limit the invention, the number D, of which it is proposed to calculate the inverse I, will be selected as the mantissa of a floating number converted to binary form and standardized. In particular, the floating formats used in scientific computers are 32 bits (short floating) or 64 bits (long floating), with 24 and 56 bit mantissas, respectively.

Figure 1:
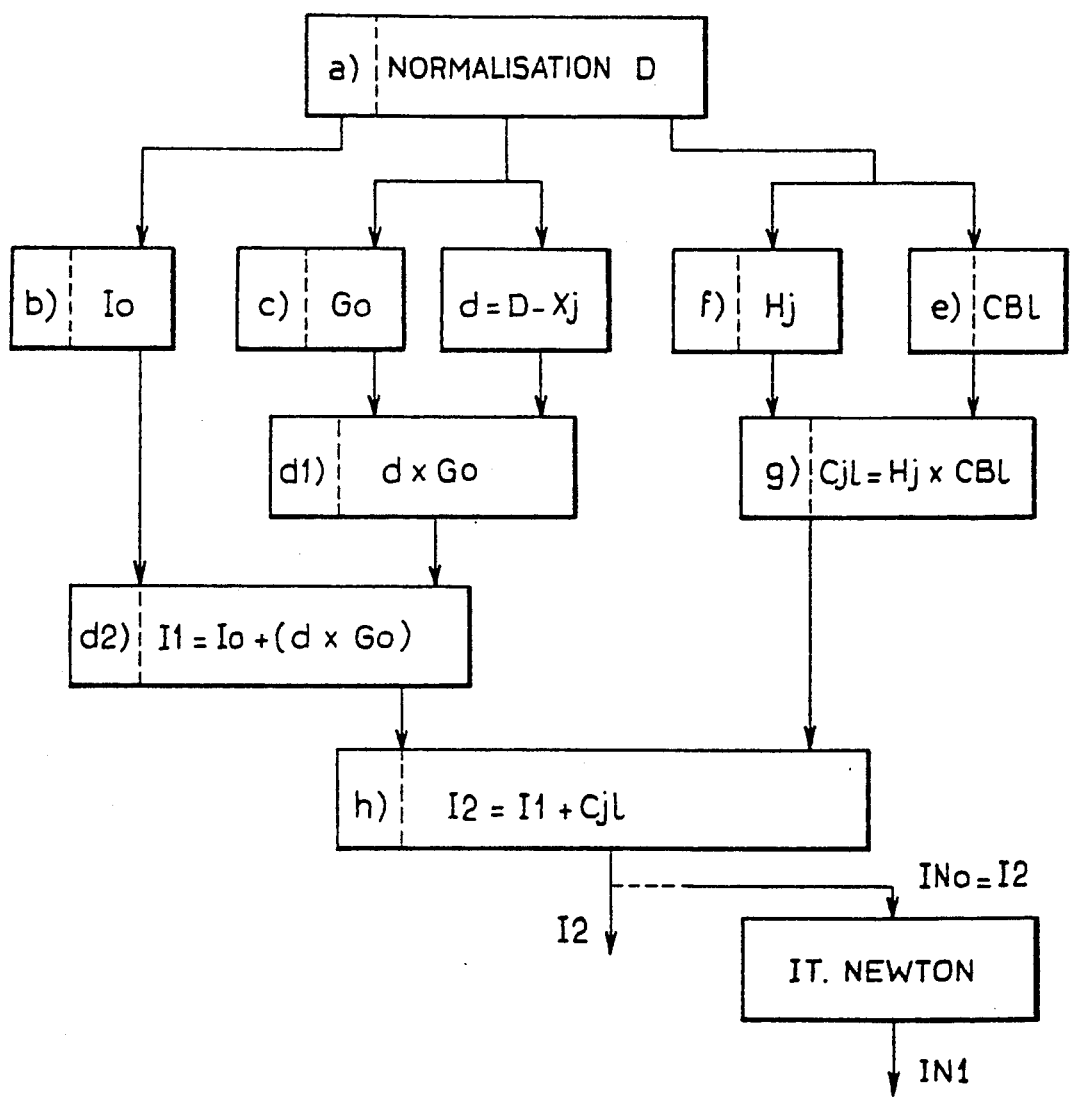
FIG. 1 is a schematic functional representation of the method of the invention.

FIG. 1 shows the schematic functional representation of the method of the invention, in which each operation is presented with its reference letter from a) to h):

a) standardization of D
b) determination of Io (on the basis of a))
c) determination of Go (on the basis of a))
d1) calculation of $d \times Go$ with $d=D-Xj$ (on the basis of a) and c))
d2) calculation of $I1=Io+(d \times Go)$ (on the basis of b) and d1))
e) determination of CBl (on the basis of a))
f) determination of Hj (on the basis of a))
g) calculation of $CJ1=Hj \times CBl$ (on the basis of e) and f))
h) calculation of $I2=I1+Cjl$ (on the basis of d2) and h)).

Moreover, in a variant of the method of the invention, I2 is used as a starting value INo of an iteration by Newton's method, the result being IN1.

The ensuing description will provide some detail on the definition of each symbol used and on how each operation proceeds. Nevertheless, the chaining of operations shown in FIG. 1 shows that the approximation I2 can be obtained without looped iteration, and that certain operations, such as the group e), f) and g), can be performed in parallel with the operations of the group b), c), d1) and d2), for example by using what is known as a "pipeline"architecture. This functional structure is especially advantageous from the standpoint of calculation speed.

Assume that $I=1/D$ is to be calculated, with $0.5 \leq D < 1$, where I and D are values of finite precision p, defined by the floating format used. D has the following binary form:

$$D=0.1a_2 \ldots a_p.$$

The inverse of D will accordingly have the following binary form:

$$I=1/D=1.b_1 \ldots b_p,$$

with $1 < I \leq 2$ and $I=10.000 \ldots 0$ for $D=0.100 \ldots 0$.

Figure 2:
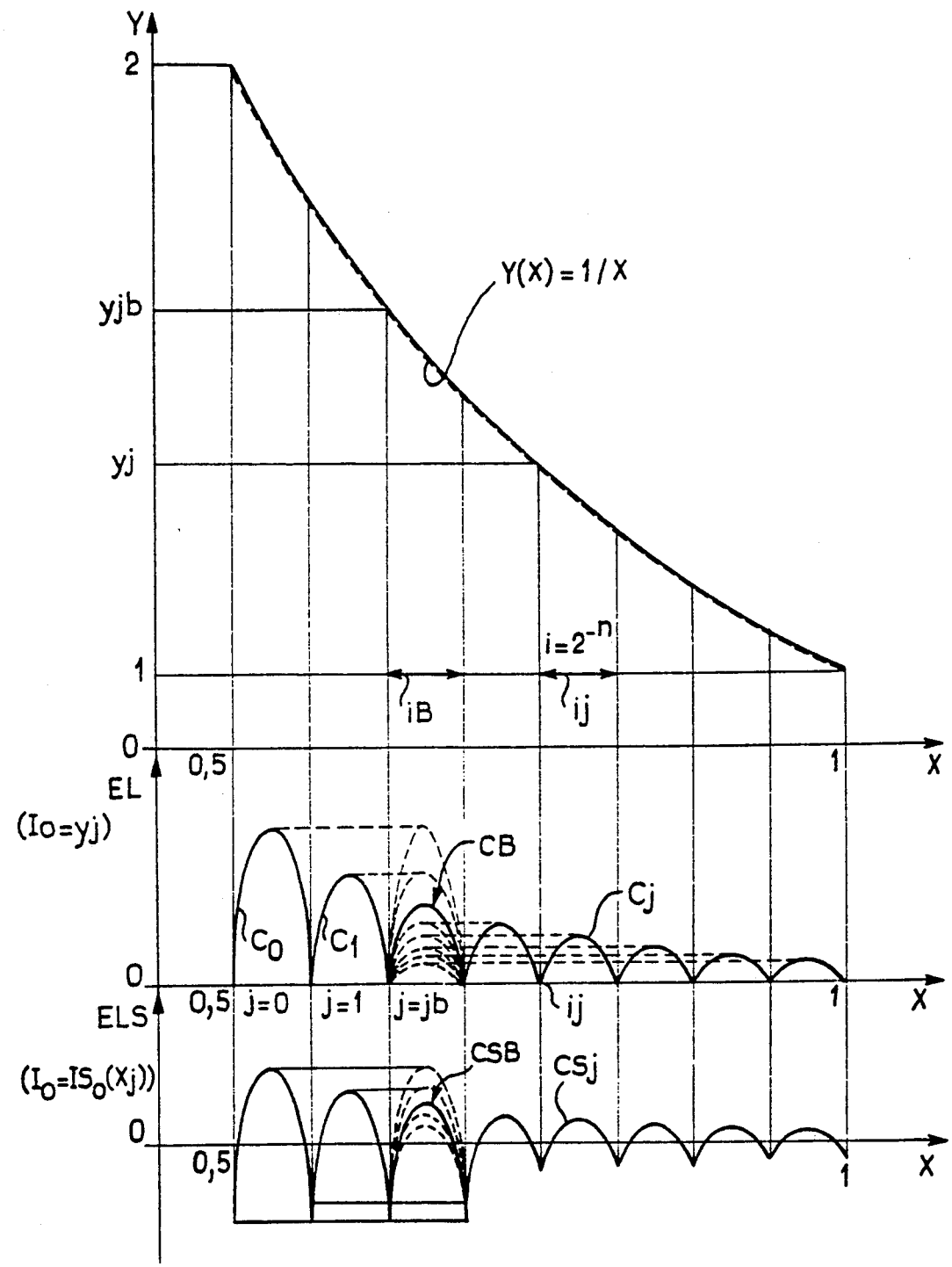
FIG. 2 is a schematic representation of the curves $Y(X)=1/X$, Cj and CSj in the interval (0.5; 1)
Figure 3:
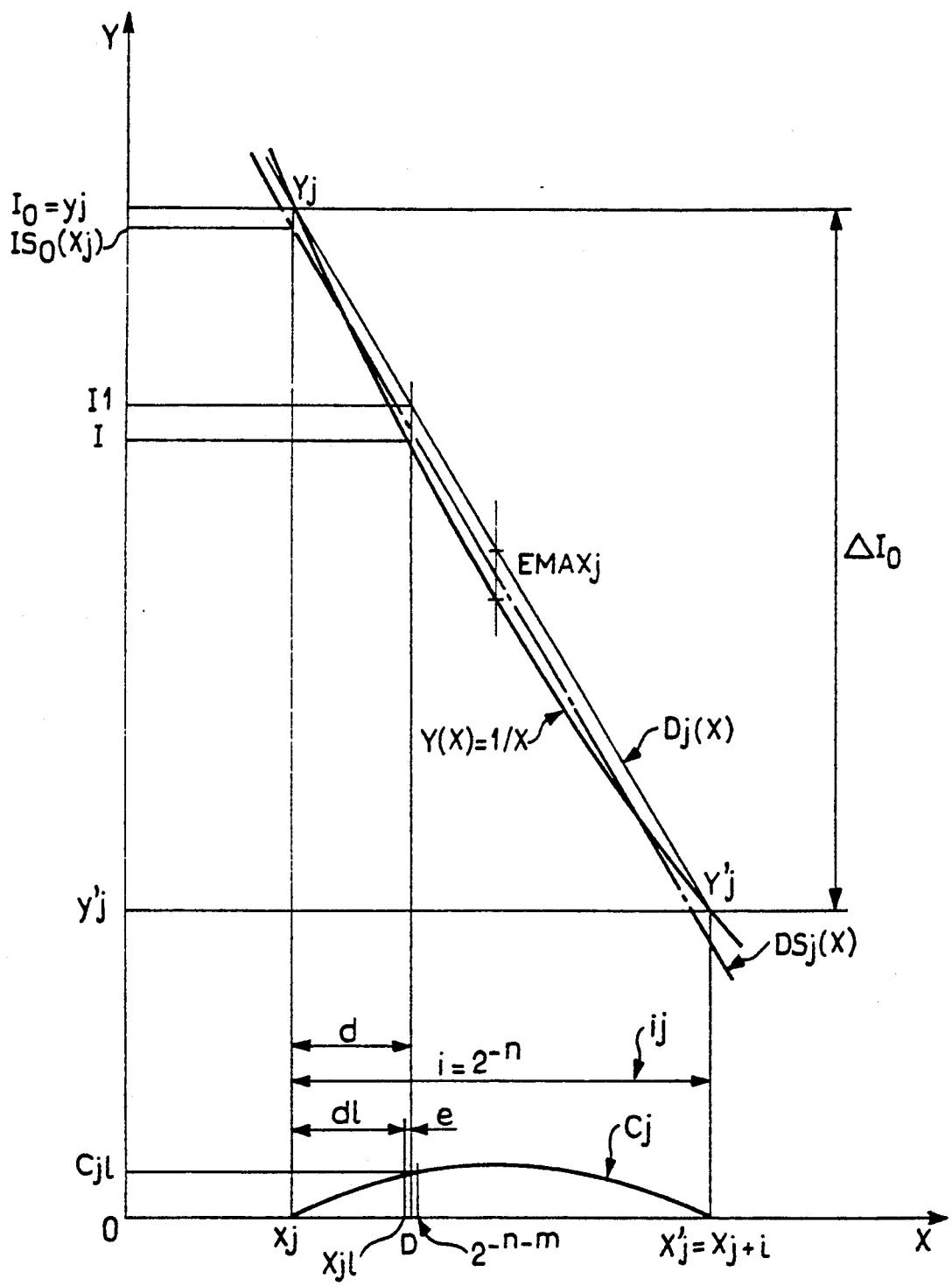
FIG. 3 is an enlarged schematic representation of the curves Y(X) and Cj of FIG. 1 in the interval $ij=[Xj, ((Xj)+i)[$.

This value is associated with the curve $Y(X)=1/X$ shown in FIG. 2. This curve is divided into $2^{n-1}$ segments in the interval from 0.5 to 1, each interval ij (of dimension $i=2^{-n}$) corresponding to one of the $2^{n-1}$ entries Xj of an inverse table T1 that gives a first approximation Io of the inverse of D. FIG. 3 shows an enlarged representation of an interval $ij=[Xj, (Xj)+i[$ of FIG. 1, on the understanding that the curves shown in these two drawing figures have been intentionally deformed to make them more legible.

DEFINITIONS

In the ensuing description, various symbols will be used, as defined below:

Xj

The entry value Xj in the table T1 is given by the expression $Xj=0.5+(j \times 2^{-n})$, with j being an integer from 0 to $2^{n-1}-1$. The value of Xj is selected to be the next lower value to D, with $Xj \leq D < X'j=(Xj)+1$.

Xj thus corresponds to the n first most significant bits of D. In fact, only the $n-1$ bits of rank 2 to n after the decimal point (the bit of rank 1 always being equal to 1 after standardization) are used to address the table T1. For reasons which will become more apparent hereinafter, the output value Io of T1 must be given with the precision of $n+m$, to which a number g of guard bits is added. These guard bits g are used to assure that the precision will be maintained during the course of the intermediate calculations.

Unless otherwise noted, it will be assumed henceforth that $Io = yj = 1/Xj$.

d

The shift d used in the linear approximation to calculate I1 is given by the expression $d = D - Xj$, with $0 \leq d < i$.

The variable d is expressed in binary form by the $p-n$ bits following the n first most significant bits of D. However, when the final precision of the calculation of I2 is less than p, the value of d can be truncated to $m+g$ (which gives d the rounded-off value $d = D - Xj - \epsilon$). The residual value of the least significant bits, which do not enter into the calculation of I2, is then ignored. However, these bits are used to calculate I (by Newton's algorithm, for example), if the precision obtained for I2, considering the size of the tables used, is inadequate; this situation is encountered to calculate inverses in the long floating format.

Go

The divergence $\Delta$Io between two successive values of yj, $yj = 1/Xj$ and $y'j = 1/((Xj)+1)$, makes it possible to calculate the inverse divergence gradient $Go = \Delta Io/i$ in the interval $ij = [Xj, (Xj)+i[$. This divergence gradient Go is given by a table T2 with the precision $n+m+g$, on the basis of the same entries as those used for table T1.

Cjl

The value of the complementary correction Cjl to be made to I1 to obtain the approximation I2 depends on the interval ij in question and on d. To do this, each interval ij is divided into $2^m$ segments, each of them being $2^{-n-m}$ in size. It is thus possible, in the interval ij, to plot the curve $Cj = Dj(X) = Y(X)$ for each value of $Xjl = Xj + (l \times 2^{-n-m})$, with l being an integer from 0 to $2^m - 1$. This curve represents the divergence between the inverse curve (Y)X and the chord Dj(X) (hence the straight line YjY'j) over the interval $ij = [Xj, ((Xj)+i)[$. Once the curve Cj is obtained, the value of the correction associated with d is given by $Cjl = Cj (Xjl)$ for $l \times 2^{-n-m} \leq d < (l+1) \times 2^{-n-m}$.

The displacement $d1 = Xjl - Xj$ is expressed in binary form by the contents of the m bits following the n first most significant bits of D, on the understanding that $m < (p-n)$.

FIG. 2 shows a representation of the series of curves Cj for the various intervals $ij = [Xj, (Xj)+i[$ between 0.5 and 1. It is naturally theoretically conceivable to provide a correction table that immediately, for each value of Xjl, gives the correction value to be applied. However, the physical size ($2^{n+m-1}$ entries) of such a table means there is only a slight advantage in size over an inverse table structured on intervals $2^{-n-m}$ in size.

One of the essential characteristics of the invention is to take advantage of the apparent affinity of the various curves Cj (which have a parabolic course) to deduce all the curves Cj from a basic curve CB by simple multiplication by a scale factor Hj representing the segment ij in question. The size of the direct correction table equivalent to the capacity of tables T3 and T4 would have been $2^{n-1}$ times that of the table T3. In FIG. 2, the basic curve $CB = Cjb$ is given for the 3rd segment from the left, by way of example, that is, iB, for $jb = 2$. The curve CB is memorized in a table T3 the entries ($2^m$ in number) of which are addressed by the m least significant bits of Xjl, and the output CBl of which is given with the precision sought for I2. The scale factor Hj itself is memorized in another table T4, which can be addressed from Xj, that is, the $n-1$ bits following the most significant bit of D.

Precision of the Algorithm Io→I1→I2 and Calculation of Hj

A) Newton's Iterative Method

Using the definitions given above, the inverse I can be expressed as follows:

$$I = 1/D = 1/((Xj)+d) = (1/Xj) \times (1/(1+d/Xj)) = yj \times 1/(1+d.yj) \quad (1)$$

where $d.yj < i.yj < 2^{-n} \times 2 << 1$

By limited development, I is then expressed in the following form:

$$I = yj(1 - d.yj + d^2.(yj)^2 - d^3.(yj)^3 \ldots) \quad (2)$$

$$I = yj(1 - (D - Xj).yj + d^2.(yj)^2 - d^3.(yj)^3 \ldots) \quad (3)$$

$$I = yj(2 - D.yj) + d^2.(yj)^3.(1 - d.yj + d^2.(yj)^2 \ldots) \quad (4)$$

It should be noted that equation 4 shows the error resulting from using Newton's method with $INo = 1/Xj$. The maximum error EN is given by the term $d^2.(yj)^3$, the maximum value of which in the interval 0.5; 1 is given by $yj = 2$ and $d = i$. As a result, $IN < 8i^2$, hence $IN < 2^{-(n-3)}$.

B. Linear Approximation Method (Calculation of I1)

The calculation of I1 by linear approximation from $Io = yj = 1/Xj$ can be expressed as follows:

$$I1 = yj + ((y'j - yj) \times (d/i)) = Io + (Go \times d) \quad (5)$$

In this expression, Io and Go are given by the tables T1 and T2, truncated and rounded off to $n+m+g$ bits. Moreover, the rounded-off value of $d = D - Xj - \epsilon$ is obtained by truncating D by n bits on the left and rounding it off to $m+g$ bits. It should be noted that the most significant bits of Go are zero, which makes a certain simplification and reduction in size of the table T2 possible.

Also, y'j can be written as follows:

$$y'j = 1/((Xj)+i) = (1/Xj).(1/(1+(i/Xj))) = yj.(1/(1+i.yj)) \quad (6)$$

hence, by limited development, $(i.yj < 2^{-(n-1)})$, $$y'j = yj.(1 - i.yj + i^2.(yj)^2 - i^3.(yj)^3 \ldots) \quad (7)$$

Equation (5) is then written as:

$$I1 = yj(1 + (d/i).(Xj.y'j - 1))) \quad (8)$$

hence by using equation (7):

$$I1 = yj(1 + (d/i).(-i.yj + i^2.(yj)^2 \ldots) \quad (9)$$

$$I1 = yj(1 - d.yj + d.i.(yj)^2 - d.i^2.(yj)^3 + \ldots) \quad (10)$$

The error EL resulting from the linear approximation method is given by:

EL=(1/D)−I1, where 1/D and I1 are given by equations (2) and (10) respectively, hence:

$$EL = yj \cdot ((1 - d \cdot yj + d^2 \cdot (yj)^2 \ldots) - (1 - d \cdot yj + i \cdot d \cdot (yj)^2 \ldots))$$

$$EL = (yj)^3 \cdot (d \cdot (d - i)) \cdot (1 - d \cdot yj + d^2 \cdot (yj)^2 - \ldots) \quad (11)$$

with $d \cdot yj < 2^{-n} \times 2 << 1$

By comparison with d, the error EL is maximal for $d = d - i - i/2$, hence $$EL < (i^2/4) \cdot (yj)^3 < (8i^2)/4 = 2^{-(2n-1)} = ELMAX$$

As a result, for the same precision of Io (inverse table addressed at the n most significant bits of D), linear approximation gives a precision of $2n-1$ significant bits, which is four times better than that of the first iteration by Newton's method.

The uncertainty (maximum value of EL in the interval ij) is the greatest in the vicinity of $X = 0.5$ ($y = 2$), and the least in the vicinity of $X = 1$ ($Y = 1$). For EL, FIG. 2 shows the error variation curves Cj (based on Io = yj) as a function of X; the error EL is in fact always negative.

C. Approximation for Complementary Correction (Calculation of I2)

Equation (11) can be written as follows:

$$EL = (yj)^3 \cdot d \cdot (d - i) \cdot (1 + f(d \cdot yj)) \quad (12)$$

with $$f(d \cdot yj) = -d \cdot yj + d^2 \cdot (yj)^2 \ldots) \quad (13)$$

When $f(d \cdot yj)$ is $<<1$, il y there will be a coefficient of proportionality between the curves $Cj \approx (yj)^3 \cdot d \cdot (d-1)$, giving EL as a function of d for the intervals ij, and the correction method proposed above proves to be correct. It is also possible to retain a basic correction value CBl as a function of d (more precisely as a function of each value dl) in table T3 and a scale coefficient Hj as a function of Xj in table T4.

In the reference interval, used to construct the base curve CB, iB = Xjb, where (Xjb) + i is divided into $2^m$ subintervals the m most significant bits of the value of d (that is, the m bits following the n most significant bits of D) representing the value d1 will serve to address table T3.

The final error is that due to the approximation $f(d \cdot yj) = c^{te}$ over the interval 0.5; 1.

Let it be assumed that $$Hj = Cj/Cjb = ((yj)^3/(yjb)^3) \times (d \cdot (d-i))/(d \cdot (d-i)) \times (1 + f(d))/(1 + fjb(d)) \quad (14)$$

with d = i

If Hj is to be independent of d and to depend only on yj, then fj(D) must be substantially equal to fjb(d). Equation (13) can then be written:

$$1 + f(d) = 1 - d \cdot y + d^2 \cdot y^2 \ldots = 1/(1 + d \cdot y) \quad (15)$$

hence $$Hj = ((yj)^3/(yjb)^3) \times ((1 + d \cdot yjb)/(1 + d \cdot yj)) = \quad (16)$$

$$Hj = K \times (yj/yjb)^3$$

hence $$K = (1 + d \cdot yj)/(1 + d \cdot yjb) \approx \quad (17)$$

-continued $$(1 + d \cdot yjb) \times (1 - d \cdot yj) \quad K \approx 1 - (d \cdot (yj - yjb))$$

the upper limit of d equals i the upper limit of (yj − yjb) equals 1 the upper limit of $d \cdot (yj - yjb) = i = 2^{-n}$ with respect to the unit for calculation of the correction, which in association with $ELMAX = 2^{-(-2n-1)}$ gives a precision of $3n-1$ bits for I2 obtained by applying the proportionality coefficient Hj.

From equation (16), it can then be stated that $$Hj = (yj/yjb)^3 = (Xjb/Xj)^3$$

Moreover, there is another source of error, due to the use, over the entire subsegment around d, of width $i \times 2^{-m}$, of the approximate constant value equal to C(Xjl). The resultant maximum error corresponds to the first subsegment (j = 0 and l = 0) of C0 0.5; $(0.5 + 2^{-m-n})$ and is equal to C0 $(0.5 + 2^{-m-n}) = 8 \times 2^{-m-n} \times 2^{-n} = 2^{-(2n+m-3)}$.

Thus it is important that the precision of table 3 $(2n + m - 3)$ is at least on the same order of magnitude as the precision $(3n - 1)$ obtained by using the proportionality coefficient. This is verified for $m \geq n + 2$.

The complementary correction thus makes it possible to obtain an additional precision of n bits, when m is selected to be greater than or equal to $n + 2$.

By way of example, the calculation method of the invention makes it possible to obtain the inverse of a 24-bit mantissa of a short floating number with values of $n = 8$ and $m = 10$, without having to use the Newton iteration method. In this case, Io is obtained from the table T1 with $n = 8$ significant bits, I1 is obtained with $2n - 1 = 15$ significant bits, and I2 is obtained with $3n - 1 = 23$ significant bits prior to standardization, hence one possible error in the 24th bit after standardization.

In the entire foregoing description, reference has always been made to an error having a constant sign, in this case negative, on the basis of Io = 1/Xj, that is, the lower limit Xj of the interval ij in question. It is possible to reduce the maximum error by half as an absolute value, by working with a signed error. Thus the linear approximation makes it possible to obtain 2n significant bits for I1. Table T2 is modified slightly to accommodate one sign bit. Space is easily found for this sign bit in T2, however, considering that the most significant bits of the elements Go of T2 are zero by construction.

From a geometrical standpoint, the straight line Dj(X) of FIG. 3 corresponding to the chord YjY'j is translated into DSj(X) vertically downward in the drawing by a value equal to |EMAXj|/2. In this case, the starting value of the linear approximation will be $Io = ISo(Xj) = (1/Xj) - |EMAXj|/2$.

Similarly, the various curves Cj are transformed by vertical translation to give the signed curves CSj shown in FIG. 2. In this configuration, the median axes of the curves CSj coincide with the axis OX. This modification makes it possible to obtain still one more supplementary significant bit after complementary correction. By using the values given again, the result obtained is 25 significant bits, which can be used for the short floating calculations. With the values $n = 9$ and $m = 11$, and by using a signed correction, I1 is obtained with $2n = 18$ significant bits, and I2 is obtained with $3n + 1 = 28$ significant bits. If the value of I2 is then used as the starting value IN0 of an iteration by Newton's method, then in the first iteration, a result IN1 with 56 significant bits is obtained, which is sufficient for calculating the inverse of a number in the long floating format (a 56-bit mantissa).

Embodiment of an Inverse Calculation Apparatus According to the Invention

FIG. 4 shows an embodiment of an apparatus according to the invention for performing the method described above. Such an apparatus is incorporated in the processing unit or processor of a conventional binary digital computer. Although not shown in FIG. 4, the apparatus is associated with a conventional standardization circuit that can be used both for circuits processing floating-format numbers and for those processing fixed-format numbers. In particular, the base-2 standardization circuit performs the shifts required to position the first bit, the value of which is 1, of the number the inverse of which is sought (or of its mantissa) as the first most significant bit of the number D and performs the corresponding modifications of the exponent. The final result of the inverse calculation may be restandardized in the proper format for its later use.

The apparatus thus includes an input register RD (12) divided into three fields: the field XJ, comprising n first most significant bits of D; the field DL, comprising the next m bits, and the field Q, comprising g guard bits. In the case where the format of B is larger than the format of I2, the least significant bits of D are not used for I2 but instead are used for the final Newton iteration.

The apparatus according to the invention is designed to be easily integratable by VLSI technology. In particular, it includes four tables T1-T4 made in the form of programmable read only memories (PROMs). In particular, the tables T1 (14), T2 (16) and T4 (20) are addressed on the basis of the n first significant bits of D. In practice, the number of entries in these tables can be reduced to $2^{n-1}$ by taking into account only the bits having the ranks of 2 through n of XJ.

At its output, the inverse table T1 furnishes the value Io, the size of which is greater than needed for the final precision sought. Thus the table T1 has a size of $((n+m+g) \times 2^{n-1})$.

The divergence table T2 furnishes an output value Go, which may or may not be signed, used for calculating the linear approximation. Go is also larger in size than needed for the precision sought, so that table T2 has a theoretical size of $((n+m+g) \times 2^{n-1})$. In practice, the values of the inverse divergences entered in T2 are such that the n first most significant bits of Go are zero, or represent the sign i.e., if Go has a sign, the bits are zero except for one bit which represents the sign and can be zero of 1 according to the sign. Hence it is possible by construction to reduce the size of T2 and to provide an output circuit of T2 capable of reformating and reframing Go in accordance with the characteristics of the format of D.

At its output, the scale table T4 furnishes the value of the scale coefficient Hj with a size on the order of n bits, to guarantee he final precision in accordance with the above discussion (see the conclusions drawn from equation (17)). Table T4 thus has a size of $(n \times 2^{n-1})$.

The correction table T3 (18) is addressed on the basis of the m bits of the field DL and thus has $2^m$ entries. At its output, table T3 furnishes the value of the basic correction coefficient CBl, with a size of approximately n bits, when m is selected to be greater than or equal to n+2.

It should be noted that the precise sizes of the tables are defined for each application on the basis of the basic values given above, but nevertheless these values are amenable to optimization by simulation, to the extent that it may prove valuable to reduce the number of guard bits. In certain cases, the number g of guard bits of the field Q of RD may be different from that selected for the outputs Io, S1 and Cjl (in the present case, the numbers of bits of the guard bits have been chosen as equal to g for convenience).

The apparatus according to the invention also includes two multiplier circuits M1 (22) and M2 (24), and adding means with three inputs Io, S1 and Cjl and one output are constituted by two adder circuits A1 (26) and A2 (28) arranged as shown in the diagram of FIG. 4. However, without departing from the scope of the invention, the two adders A1 and A2 are replaced with a single adder circuit having three inputs (not shown).

The multiplier M1 is used to calculate the correction to be introduced into the calculation of the value I1 by linear approximation. The two operands of M1 are the output value Go of T2, on the one hand, and the $(m+g)$ least significant bits of D representing the displacement $d = D - Xj$ to the i.e., with a possible error less or equal to $\epsilon$. Once again, it is possible to work only the $(m+g)$ least significant bits of Go, so that the size of the multiplier is $((m+g) \times (m+g))$. Advantageously, this multiplier may be that of the mantissas of the multiplication operator. The output value S1 of the multiplier M1 is suitably framed and truncated to $n+m+g$ bits and then is applied to one of the two inputs of the adder A1. The other input of the adder A1 receives the value Io furnished by the table T1. Advantageously, in the case where Go (and S1) is expressed with a signed value, the adder A1 is selected to be the adder/subtractor type.

The multiplier M2 is used to calculate the correction coefficient Cjl. By the indications given above, the size of this multiplier is modest $(n \times n)$. The two operands of M2 are constituted by the output value Hj of table T4 and by the output value CBl of table T3. In the case where the values memorized in table T3 are signed, the same is true for the output value Cjl of the multiplier M2. This output value Cjl is truncated and framed to $n+m+g$ bits so that it can be suitably loaded into the adder A2. The operands of the adder A2 are consequently Cjl and I1, the latter furnished by the multiplier M1. The adder A2, signed or not as applicable, furnishes the value I2 at its output, in a format of $n+m+g$ bits with a maximum of $3n-1$ significant bits (or a maximum of $3n+1$ significant bits in the event that a signed approximation is calculated).

Finally, the apparatus includes hardware means for performing at least one Newton iteration on the basis of I2. This iteration can be done by programming, to reduce the number of specific circuits. In that case, an operation of standardization to a different base, depending on the specifics of the computer (for example, to base 16), is done for the value of I2 at the output of A2. On the other hand, this operation is unnecessary if the Newton iteration is done by specific microprogrammed circuits (as in the case shown in FIG. 1).

As shown in FIG. 4, an overall memory composed of the individual memories 14, 16, 18, and 20 may be considered to have first, second, third, and fourth memory zones corresponding respectively to 14, 16, 18, and 20. More specifically, this overall memory may be considered to be a PROM composed of PROM units 14, 16, 18, and 20, each of which is considered to be a hardware memory element. Since the memory units 14, 16, 18, and 20 are programmable read only memory devices, it will be readily appreciated that the memories have contents which cannot normally be changed. In other words, such memories have contents which do not change normally and cannot normally be alternated.

As will be appreciated from FIG. 4, the two multiplier circuits M1 and M2 (22 and 24) may collectively be referred to as multiplier circuitry. More generally, the multipliers M1 and M2 together with the adders A1 and A2 (26 and 28) may collectively be referred to as calculation circuitry.

It is apparent from the foregoing description that the inverse of the mantissa of a short floating number can be calculated without having to use Newton's method (which requires a large-sized complementary set of multipliers), at the cost of additional tables (T3 and T4) of modest size. Moreover, in the case where the main multiplier M1 comprises adders arranged in a structure known as a Wallace tree, the adders A1 and A2 are easily integratable into this structure. Finally, it should be noted that the two multipliers M1 and M2 operate independently and simultaneously, which is important in scientific computers for the sake of the speed with which the division operation can be executed.

What is claimed is:

1. A digital computer for calculating the inverse I of a number D, comprising at least one processor including therein:
   means for conversion and standardization of the number D, as applicable, to binary form;
   a first memory forming an inverse table (T1) addressed as a function of n most significant bits of the number D and having an output Io,
   a second memory forming a divergence gradient table (T2) addressed as a function of the n most significant bits of the number D and having the output $G_o$,
   a first multiplier circuit (M1) having an output S1 and an entry multiplier which receives at least m bits following the n most significant bits of D and Go,
   a third memory forming a correction table (T3), addressed as a function of the m bits following the n most significant bits of D and having an output (CBl,
   a fourth memory forming a scale table (T4) addressed as a function of the n most significant bits of the number D and having an output Hj,
   a second multiplier circuit (M2), the inputs of which receive the outputs CBl and Hj and which has an output Cjl, and
   an adder (A1 and A2) having three inputs connected to receive the outputs Io, S1 and Cjl, and having an output I2.

2. The computer of claim 1, characterized in that it further includes means for performing a programmed iteration by Newton's method on the basis of the value I2.

3. The computer of claim 2, characterized in that the dimensions Io, Go, S1, I1 and I2 are equal to n+m+g, with $g \geq 0$.

4. The computer of claim 3, characterized in that the table T3 includes $2^m$ entries, with $m \geq n+2$.

5. The computer of claim 2, characterized in that the table T3 includes $2^m$ entries, with $m \geq n+2$.

6. The computer of claim 1 further including means for working the table T2, the multiplier M1 and the adder (A1, A2) on signed operands.

7. The computer of claim 6, characterized in that the dimensions Io, Go, S1, I1 and I2 are equal to n+m+g, with $g \geq 0$.

8. The computer of claim 7, characterized in that the table T3 includes $2^m$ entries, with $m \geq n+2$.

9. The computer of claim 6, characterized in that the table T3 includes $2^m$ entries, with $m \geq n+2$.

10. The computer of claim 1 further including means for working the table T2, the multiplier M1 and the adder (A1, A2) on signed operands.

11. The computer of claim 10, characterized in that the dimensions Io, Go, S1, I1 and I2 are equal to n+m+g, with $g \geq 0$.

12. The computer of claim 11, characterized in that the table T3 includes $2^m$ entries, with $m \geq n+2$.

13. The computer of claim 10, characterized in that the table T3 includes $2^m$ entries, with $m \geq n+2$.

14. The computer of claim 1, characterized in that the dimensions Io, Go, S1, I1 and I2 are equal to n+m+g, with $g \geq 0$.

15. The computer of claim 14, characterized in that the table T3 includes $2^m$ entries, with $m \geq n+2$.

16. The computer of claim 1, characterized in that the table T3 includes $2^m$ entries, with $m \geq n+2$.

17. The computer of claim 1 wherein at least one of said first, second, third and fourth memories is a read only memory (ROM).

18. The computer of claim 1 wherein at least one of said first, second, third and fourth memories is a programmable read only memory (PROM).

19. Device for calculating the inverse I of a binary number D having a decimal value less than 1 and greater than or equal to 0.5 including:
   (a) memory (14, 16, 18, 20) containing first, second, third and fourth tables (T1, T2, T3, T4),
   (b) first means for searching in said first table (T1) for a first approximation Io of the inverse of the number D, on the basis of n first most significant bits of D corresponding to an input value $Xj - \frac{1}{2} + (J \times 2^{-n})$, where j is an integer from 0 to $2^{n-1} - 1$,
   (c) second means for searching in said second table (T2) for the inverse divergence gradient Go=ΔIo/i in the interval ij equals Xj to ((Xj)+i) framing the value D, with $i = 2^{-n}$,
   (d) means (M1, A1) for calculating a second value I1 =Io+(d×Go), where d=D−Xj and Go is entered as an algebraic value,
   (e) third means for searching in said third table (T3), on the basis of d, for a pre-established basic correction value CBl representing the divergence E=I1 in a basic interval iB equals Xjb to ((Xjb)+i), where jb is a particular value of j,
   (f) fourth means for searching in said fourth table (T4) for a scale factor Hj on the basis of Xj,
   (g) means (M2) for determining a correction value Cjl=CBl×Hj, and
   (h) means (A2) for determining a third approximation I2=I1+Cjl, and
wherein said memory includes programmable read only memory.

20. A method, in a digital computer having memory having first, second, third, and fourth memory zones wherein the memory contents cannot normally be changed, for calculating the inverse I of a number D, including the following operations:
   (a) converting and standardizing the number D, as applicable, to binary form;

(b) searching in an inverse table T1 in said first memory zone for a first approximation Io of the inverse of the number D, on the basis of n first most significant bits of D corresponding to an input value $xj-\frac{1}{2}+(J\times 2^{-n})$, where j is an integer from 0 to $2^{n-1}-1$, (c) searching in a divergence table T2 in said second memory zone for the inverse divergence gradient $Go-\Delta Io/i$ in the interval $ij=((Xj), ((Xj)+i))$ framing the value D, with $i-2^{-n}$, (d) by linear approximation, determining a second value I1 by using the algorithm $I1=Io+(d\times Go)$, where $d=D-Xj$ and Go is entered as an algebraic value, (e) searching in a correction table T3 in said third memory zone, on the basis of d, for a pre-established basic correction value CBl, representing the divergence $E-I-I1$ in the basic interval $iB-((xjB), ((XjB)+i))$, (f) searching in a scale table T4 in said fourth memory zone for a scale factor Hj on the basis of Xj, (g) determining a correction value $Cjl-CBl\times Hj$, and (h) determining a third approximation $I2-I1+Cjl$ and wherein each of said first, second, third, and fourth memory zones are programmable read only memory locations.

21. A digital computer for calculating the inverse I of a number D, comprising at least one processor including therein:

means for conversion and standardization of the number D, as applicable, to binary form;

a memory having first, second, third, and fourth memory zones;

said first memory zone forming an inverse table (T1) addressed as a function of n most significant bits of the number D and having an output Io, said second memory zone forming a divergence gradient table (T2) addressed as a function of the n most significant bits of the number D and having the output Go;

multiplier circuitry (M1, M2) having an output S1 and an entry multiplier which receives at least m bits following the n most significant bits of D and Go;

said third memory zone forming a correction table (T3) addressed as a function of the m bits following the n most significant bits of D and having an output CBl;

said fourth memory zone forming a scale table (T4) addressed as a function of the n most significant bits of the number D and having an output Hj;

said multiplier circuitry (M1, M2) further having inputs receiving the outputs CBl and Hj, said multiplier circuitry further having an output Cjl; and an adder (A1, A2) having three inputs connected to receive the outputs Io, S1, and Cjl, and having an output I2.

22. Device for calculating the inverse I of a binary number D having a decimal value less than 1 and greater than or equal to 0.5, including:

(a) memory (14, 16, 18, 20) containing first, second, third and fourth tables (T1, T2, T3, T4), (b) first means for searching in said first table (T1) for a first approximation Io of the inverse of the number D, on the basis of n first most significant bits of D corresponding to an input value $Xj-\frac{1}{2}+(J\times 2^{-n})$, where j is an integer from 0 to $2^{n-1}-1$, (c) second means for searching in said second table (T2) for the inverse divergence gradient $Go=\Delta Io/i$ in the interval ij equals Xj to $((Xj)+i)$ framing the value D, with $i=2^{-n}$, (d) calculation circuitry (M1, M2, A1, A2) for calculating a second value $I1=Io+(d\times Go)$, where $d=D-Xj$ and Go is entered as an algebraic value, said calculation circuitry including multiplier circuitry and an adder, (e) third means for searching in said third table (T3), on the basis of d, for a pre-established basic correction value CBl representing the divergence $E=I-I1$ in a basic interval iB equals Xjb to $((Xjb)+i)$, where jb is a particular value of j, (f) fourth means for searching in said fourth table (T4) for a scale factor Hj on the basis of Xj, and wherein said calculation circuitry determines a correction value Cjl equals $Cbl\times Hj$ and determines a third approximation $I2=I1+Cjl$.

23. The device of claim 22 wherein said memory has contents which cannot normally be changed and wherein said memory includes a hardware memory element.

* * * * *